United States Patent
Chen et al.

(10) Patent No.: US 8,212,422 B2
(45) Date of Patent: Jul. 3, 2012

(54) HAND-HELD ELECTRONIC DEVICE AND METHOD FOR PREVENTING FALL OF THE SAME

(75) Inventors: Wen-Yu Chen, Taipei County (TW); Ching-Feng Hsieh, Taipei (TW)

(73) Assignee: Askey Computer Corp., New Taipei (TW)

( * ) Notice: Subject to any disclaimer, the term of this patent is extended or adjusted under 35 U.S.C. 154(b) by 308 days.

(21) Appl. No.: 12/624,971

(22) Filed: Nov. 24, 2009

(65) Prior Publication Data
US 2011/0109170 A1 May 12, 2011

(30) Foreign Application Priority Data
Nov. 6, 2009 (TW) .............................. 98137795 A

(51) Int. Cl.
*H01H 35/14* (2006.01)
(52) U.S. Cl. ........................................................ 307/121
(58) Field of Classification Search ................... 307/121
See application file for complete search history.

(56) References Cited

U.S. PATENT DOCUMENTS

| | | | | |
|---|---|---|---|---|
| 7,154,692 B2 * | 12/2006 | Ogawa et al. | ................... | 360/61 |
| 7,318,170 B2 * | 1/2008 | Makela et al. | ................... | 714/22 |
| 7,549,335 B2 * | 6/2009 | Inoue et al. | ................... | 73/510 |
| 7,626,355 B2 * | 12/2009 | Burgan et al. | ................... | 320/106 |
| 7,865,253 B2 * | 1/2011 | Harrington | ................... | 700/21 |
| 2002/0089422 A1 * | 7/2002 | Anderson et al. | ................... | 340/540 |
| 2005/0022039 A1 * | 1/2005 | Inui et al. | ................... | 713/300 |
| 2007/0146924 A1 * | 6/2007 | Nishioka | ................... | 360/75 |
| 2008/0218366 A1 | 9/2008 | Chen | | |
| 2009/0159408 A1 * | 6/2009 | Sunder | ................... | 200/61.45 R |
| 2010/0062833 A1 * | 3/2010 | Mattice et al. | ................... | 463/24 |
| 2011/0161042 A1 * | 6/2011 | Krancher et al. | ................... | 702/141 |

FOREIGN PATENT DOCUMENTS

JP 2007214751 A * 8/2007

OTHER PUBLICATIONS

Leerlaufverlust from Wikipedia http://de.wikipedia.org/wiki/Leerlaufverlust.

* cited by examiner

*Primary Examiner* — Adi Amrany
(74) *Attorney, Agent, or Firm* — WPAT, P.C.; Anthony King

(57) ABSTRACT

The hand-held electronic device includes a central processing unit, a memory unit, a state-detecting unit, a state-determining unit, a main power supply unit, a standby power supply unit, and a power supply switching unit. After determining the presence of a fall state, the state-determining unit will output a fall instruction and which causes the central processing unit to enter a low current mode; meanwhile, the power supply switching unit monitors power output and continues to supply low-potential power. In case of a fall of the hand-held electronic device, the device and method protect operation data and reduce the otherwise power-consuming current. The less power-consuming current is conducive to the reduction of capacitance required for a backup battery. The low current mode is effective in reducing the time taken to recover the operation mode of the electronic device.

7 Claims, 4 Drawing Sheets

HAND-HELD ELECTRONIC DEVICE AND METHOD FOR PREVENTING FALL OF THE SAME

CROSS-REFERENCE TO RELATED APPLICATIONS

This non-provisional application claims priority under 35 U.S.C. §119(a) on Patent Application No(s). 098137795 filed in Taiwan, R.O.C. on 6 Nov. 2009, the entire contents of which are hereby incorporated by reference.

FIELD OF THE INVENTION

The present invention relates to hand-held electronic devices and methods for protecting data stored in the hand-held electronic devices while the hand-held electronic devices are falling, and more particularly, to a hand-held electronic device and a method for protecting data stored in the hand-held electronic device while the hand-held electronic device is falling.

BACKGROUND OF THE INVENTION

If an existing hand-held electronic device, such as a cell phone, PDA, GPS, or media player, falls inadvertently while in an ON state and thus hits something else, it not only will influence the appearance of the casing of the hand-held electronic device, but even worse, it will interrupt the internal operation of the hand-held electronic device and cause the losses or damages of operating data.

U.S. patent application NO 20080218366, a document pertinent to the prior art, discloses a protection system of a portable electronic device comprising an accelerometer, which is configured to measure an acceleration signal generated from movement in at least one direction; and a processor is configured to receive the acceleration signal and compare that signal with a preset value in order to judge whether an fall or an impact has occurred. The central processor unit may start the mode of "turn off" to shut down the portable electronic device according to a built in routine if the fall or the impact is detected.

However, it takes unduly long time for the portable electronic device to enter the protection mechanism for the shutdown routine, and it also takes unduly long time to execute the shutdown routine. In practice, the execution of a shutdown routine is seldom totally completed when an impact occurs to an electronic device, and consequently, the electronic device may meet the conditions of data loss or damage. Moreover, it is inconvenient and time-consuming to restart an electronic device after a shutdown routine has done. Furthermore, a battery of an electronic device is likely to be disconnected as soon as an impact is exerted upon the electronic device, and the disconnection of the battery from the electronic device is immediately followed by interruption of a shutdown routine which may result in the data loss or damage, because the required power for the operation of the electronic device is supplied by the battery.

SUMMARY OF THE INVENTION

It is a primary objective of the present invention to provide a hand-held electronic device and a method for protecting data stored in the hand-held electronic device while the hand-held electronic device is falling, so as to prevent data loss that might otherwise occur to the hand-held electronic device while the hand-held electronic device is operating.

Another objective of the present invention is to provide a hand-held electronic device and a method for protecting data stored in the hand-held electronic device while the hand-held electronic device is falling, so as to-speed up the transition from a protection state to an operation state of the hand-held electronic device.

Yet another objective of the present invention is to provide a hand-held electronic device and a method for protecting data stored in the hand-held electronic device while the hand-held electronic device is falling, so as to prevent, while the hand-held electronic device is operating, the loss of data stored therein when a primary battery is disconnected from the hand-held electronic device because of the fall of the hand-held electronic device.

To achieve the above and other objectives, the present invention provides a hand-held electronic device comprising: a state-detecting unit for detecting a motion state of the hand-held electronic device and accordingly, generating the state information; a state-determining unit electrically connected to the state-detecting unit and configured to receive the state information and selectively output a fall instruction according to a preset safe motion state parameter; a central processing unit electrically connected to the state-determining unit and configured to receive the fall instruction, trigger storage of operation data during operation of the hand-held electronic device according to the fall instruction, and cause the hand-held electronic device to enter a low current mode upon completion of the operation data storage; a memory unit electrically connected to the central processing unit and configured to store the safe motion state parameter and the operation data; a main power supply unit; a standby power supply unit for supplying power required for the low current mode, wherein capacitance of the standby power supply unit is less than that of the main power supply unit; and a power supply switching unit connected to the main power supply unit, the standby power supply unit, and the central processing unit which are configured to switch between the main power supply unit and the standby power supply unit, wherein the central processing unit causes the power supply switching unit to switch to the standby power supply unit upon disconnection of the main power supply unit.

To achieve the above and other objectives, the present invention provides a method for protecting data stored in the hand-held electronic device while the hand-held electronic device is falling. The method comprises the steps of: (1) detecting a motion state of the hand-held electronic device and generating state information; (2) comparing the state information with a preset safe movement state parameter and generating a fall instruction if the state information exceeds a range of the safe movement state parameter; (3) storing operation data in operation according to the fall instruction; and (4) switching to a low current mode and, upon disconnection of a main power supply unit, switching to a standby power supply unit, wherein the standby power supply unit has capacitance lower than capacitance of the main power supply unit.

The state-detecting unit may be one of an acceleration detector, a gyroscope, or a combination of the acceleration detector and the gyroscope. The low current mode may be a hibernation mode or a standby mode.

According to the present invention, upon a fall of a hand-held electronic device, operation data of the hand-held electronic device is stored for backup and the hand-held electronic device enters a low current mode so as to reduce power-consuming current. Unlike a shutdown mode, the low current mode does not totally shut down the hand-held electronic device; instead, it can quickly transit from the low current mode to the operation mode. Also, there is little power consumption in the low current mode, and thus capacitance of the standby power supply unit can be reduced to thereby prevent hit-induced disconnection and ensuing power failure. In case of disconnection and resultant power failure of the main power supply unit, the standby power supply unit supplies power required for the low current mode. Accordingly, the present invention provides a hand-held electronic device and a method for protecting data stored in the hand-held electronic device while the hand-held electronic device is falling, so as to reduce and simplify the fastening requirements for a fastening element configured for use with the main power supply unit, and thus allow the fastening mechanism to be designed with more flexibility.

DETAILED DESCRIPTION OF THE EMBODIMENTS

To enable persons skilled in the art to gain insight into the objectives, features, and effects of the present invention, the present invention is illustrated with the following specific embodiments in conjunction with the accompanying drawings. The present invention is described in detail as follows.

Figure 1:
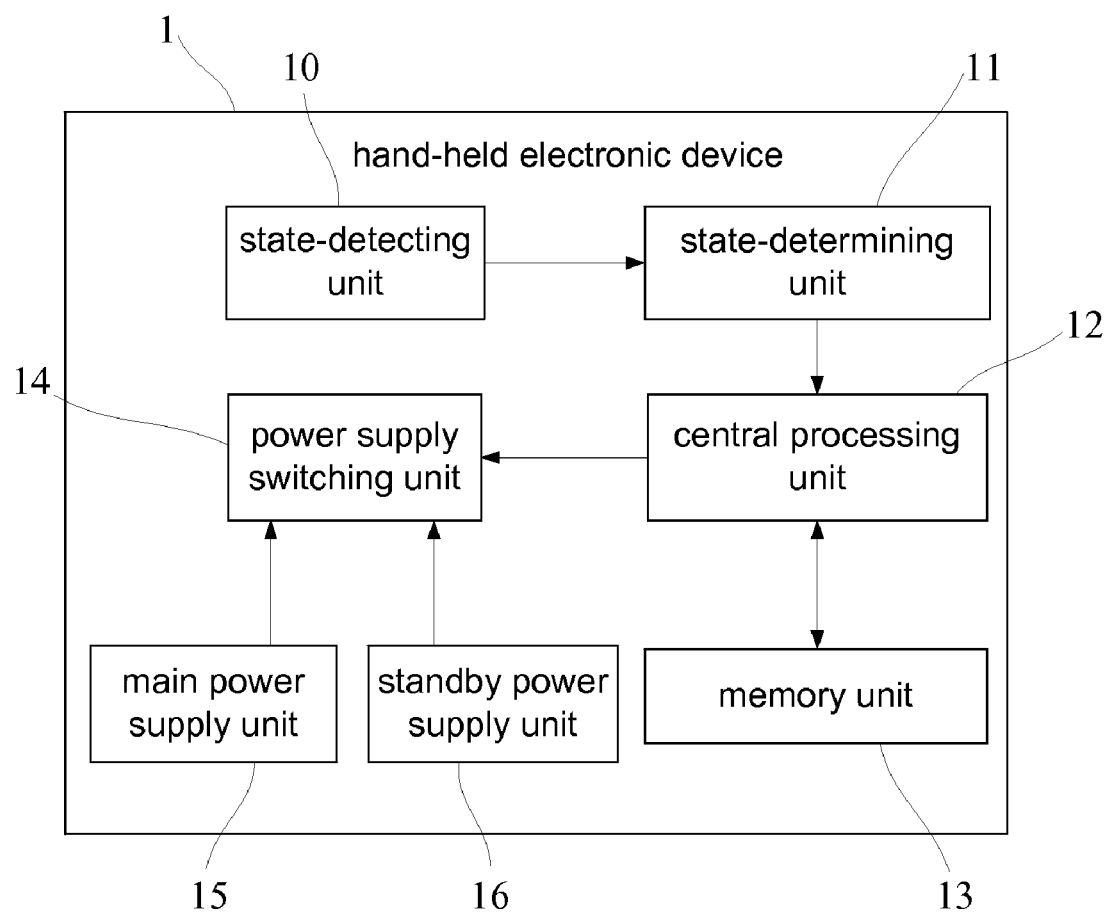
FIG. 1 is a functional block diagram of a hand-held electronic device in an embodiment according to the present invention.

Referring to FIG. 1, there is shown a functional block diagram of a hand-held electronic device in an embodiment according to the present invention. As shown in the drawing, the present invention provides a hand-held electronic device 1 comprising a state-detecting unit 10, a state-determining unit 11, a central processing unit 12, a memory unit 13, a power supply switching unit 14, a main power supply unit 15, and a standby power supply unit 16.

The state-detecting unit 10 is configured to detect a motion state in the outside of the state-detecting unit 10 and generate state information according to the result of the detecting the motion state. The outside of the state-detecting unit 10 is narrowly defined as the hand-held electronic device 1 itself. The state-detecting unit 10 is an acceleration detector, a gyroscope, or a combination of the acceleration detector and the gyroscope, or any other equivalent state-detecting device.

When the hand-held electronic device 1 falls off or slips out of a user's hand, the hand-held electronic device 1 falls under gravity in the absence of any other supporting force; meanwhile, the hand-held electronic device 1 undergoes free fall and its acceleration is equal to the acceleration of gravity. The state is known as a fall state.

The acceleration detector is a sensing module for sensing acceleration in three dimensions and comprises a x-axis sensor, a y-axis sensor, and a z-axis sensor for sensing linear acceleration of the hand-held electronic device 1 along the x-axis, y-axis, and z-axis, respectively. Additionally, the gyroscope which mainly measures angular acceleration of a rotating object is configured to measure rotational movement of the hand-held electronic device 1. Therefore, when the state-detecting unit 10 is the acceleration detector, the state-detecting unit 10 senses linear acceleration of the hand-held electronic device 1 in all directions. When the state-detecting unit 10 is the gyroscope, the state-detecting unit 10 senses angular acceleration of the hand-held electronic device 1 in rotational movement. When the state-detecting unit 10 is a combination of the acceleration detector and the gyroscope, the state-detecting unit 10 accurately measures the movement of the hand-held electronic device 1. With the aforesaid apparatuses, it is feasible to identify different states of the hand-held electronic device 1, such as a fall state, a rotation state, or an ejection state.

The state-determining unit 11 is electrically connected to the state-detecting unit 10 and configured to receive the state information. If the state information shows that the hand-held electronic device 1 exceeds the range of a preset safe movement state parameter, it means that the hand-held electronic device 1 is in the fall state. If acceleration exceeds a specific value, the state-determining unit 11 sends out a fall instruction.

The central processing unit 12 is electrically connected to the state-determining unit 11 and configured to switch, upon receipt of the fall instruction, the hand-held electronic device 1 to a low current mode. The low current mode is in a hibernation mode or a standby mode. The hand-held electronic device 1 consumes much less power in the low current mode than in a typical operation mode.

The memory unit 13 is electrically connected to the central processing unit 12 and configured to store operation data of the hand-held electronic device 1 in operation and store a preset safe movement state parameter. To protect the operation data of the hand-held electronic device 1 against loss or damage due to hit-induced power interruption, the central processing unit 12 instructs the memory unit 13 to store the operation data of the hand-held electronic device 1 in operation as soon as the fall state is identified.

The power supply switching unit 14 which is configured to switch power supplied to the hand-held electronic device 1 is connected to a main power supply unit 15 and a standby power supply unit 16. Upon the disconnection of the main power supply unit 15, the output of the power supply switching unit 14 is switched to the standby power supply unit 16. Owing to the lower power requirements for the low current mode, capacitance of the standby power supply unit 16 can be less than that of the main power supply unit 15 to thereby greatly reduce the size of the standby power supply unit 16 and, for example, allow the standby power supply unit 16 to be integrated into an inbuilt motherboard (circuit board) so as to prevent a hit-induced fall.

To implement the present invention, the state-detecting unit 10 detects a motion state of the outside (which is essentially a motion state of, the hand-held electronic device 1) and generates state information. Then, the state information is output to the state-determining unit 11. If the state information exceeds the range of a safe movement state parameter, the state-determining unit 11 generates a fall instruction and outputs the fall instruction to the central processing unit 12. Afterward, the central processing unit 12 triggers the storage of operation data in the memory unit 13 during operation of the hand-held electronic device 1 according to the fall instruction and enables the hand-held electronic device 1 to enter the low current mode. Finally, power output is put under surveillance such that the power supply switching unit 14 switches, upon disconnection and thus power failure of the main power supply unit 15, to the standby power supply unit 16 for supplying power required for the low current mode.

In an embodiment, the hand-held electronic device 1 is a hand-held data collecting device, a hand-held communication device, or a hand-held data processor.

Figure 2:
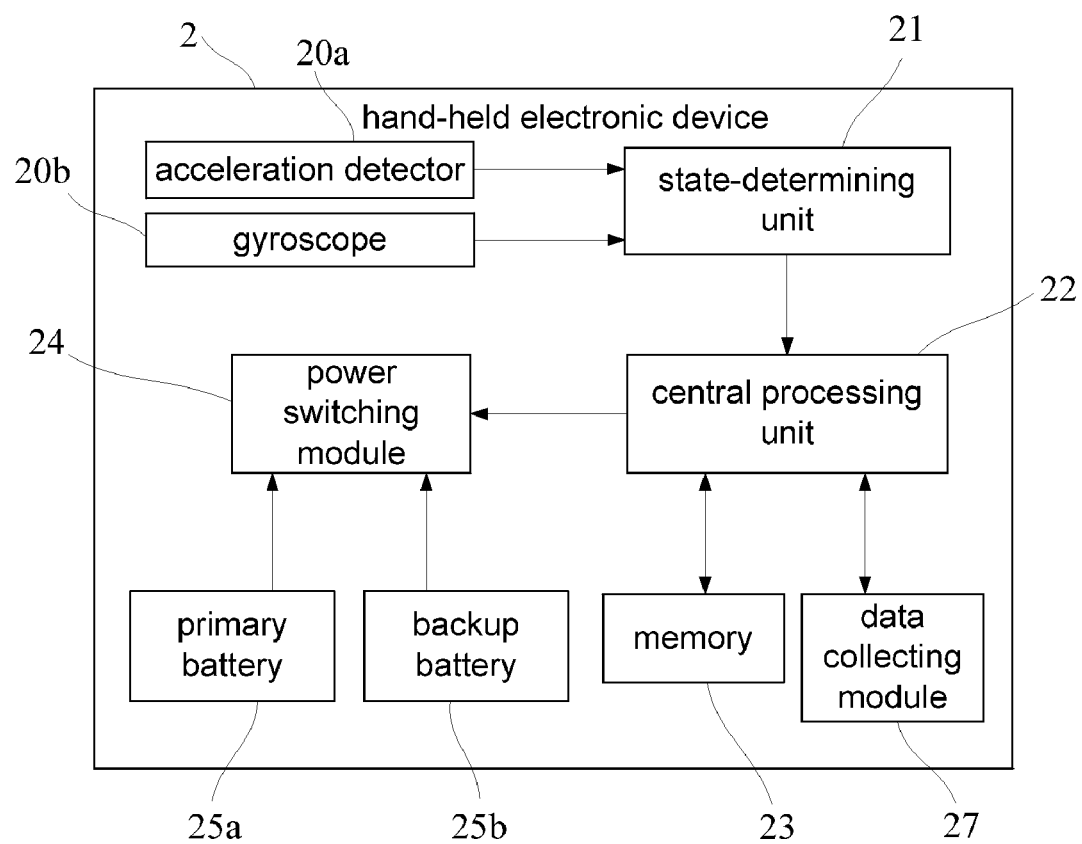
FIG. 2 is a functional block diagram of the hand-held electronic device in another embodiment for comparison according to the present invention.

Referring to FIG. 2, there is shown a functional block diagram of the hand-held electronic device in another embodiment according to the present invention. As shown in the drawing, a hand-held electronic device 2 comprises an acceleration detector 20a, a gyroscope 20b, a state-determining unit 21, a central processing unit 22, a memory 23, a power switching module 24, a primary battery 25a, a backup battery 25b, and a data collecting module 27. In this embodiment, the central processing unit 22 instructs a peripheral device, that is, the data collecting module 27, to collect data, and thus data security is of vital importance, because a data collection operation entails accessing plenty of data in the form of barcode data, for example.

To implement the present invention, a motion state of the outside (which is essentially a motion state of the hand-held electronic device 2) is detected by the acceleration detector 20a and the gyroscope 20b. The acceleration detector 20a detects the level and direction of acceleration of the hand-held electronic device 2. In this embodiment, to determine in real time whether the hand-held electronic device 2 is in the fall state, it is necessary to determine whether the output value of the acceleration detector 20a exceeds the range of the safe movement state parameter stored on the memory 23. Take the fall state as an example, the gravity (acceleration) of the Earth is denoted with G. For instance, if the acceleration detector 20a outputs a downward G value for a specific period of time, falling a distance of more than 1.225 meters for 0.5 second or falling a distance of more than 4.9 meters for 1 second indicates that the hand-held electronic device 2 is in the fall state. For instance, if acceleration values in all directions are output within a very short period of time, it indicates that the hand-held electronic device 2 is very likely to be in a hit or tumble state. Also, take the gyroscope 20b as an example, since the axle of the gyroscope 20b always points in a fixed direction, a comparison of the fixed direction with the axis along which the hand-held electronic device 2 moves allows the direction of the movement of the hand-held electronic device 2 to be accurately identified. If the hand-held electronic device 2 moves towards the ground for a specific period of time, it indicates that the hand-held electronic device 2 is in the fall state. The critical ranges of the aforesaid states can be preset with respect to the safe movement state parameter.

Upon its receipt of the information of fall state, the state-determining unit 21 generates a fall instruction and outputs the fall instruction to the central processing unit 22. The purpose of the fall instruction is to allow the hand-held electronic device 2 to shut down the power of a peripheral device, that is, to shut down the power of the data collecting module 27, and allow the hand-held electronic device 2 to operate in the low current mode, such as a hibernation mode or a standby mode. Afterward, to protect the operation data against hit-induced power interruption and thus resultant data loss or damage, the central processing unit 22 stores the operation data of the data collecting module 27 to the memory 23 according to the fall instruction and enables the hand-held electronic device 2 to enter a low power consumption mode. Eventually, the power switching module 24 monitors the power output of the primary battery 25a having high capacitance such that the power switching module 24 switches, upon disconnection of the primary battery 25a, to the backup battery 25b having low capacitance for supplying low power required for the low current mode.

The device and method of the present invention prevents data loss or damage which might otherwise occur due to sudden power interruption while the data collecting module 27 is operating, enables the hand-held electronic device to enter a low power consumption state as soon as the operation data is stored, and allows standby power to be of low capacitance. Hence, due to the device and method of the present invention, there can be lenient fastening requirements for a fastening element configured for use with the main power supply unit, such that fastening mechanism design can be flexible.

Figure 3:
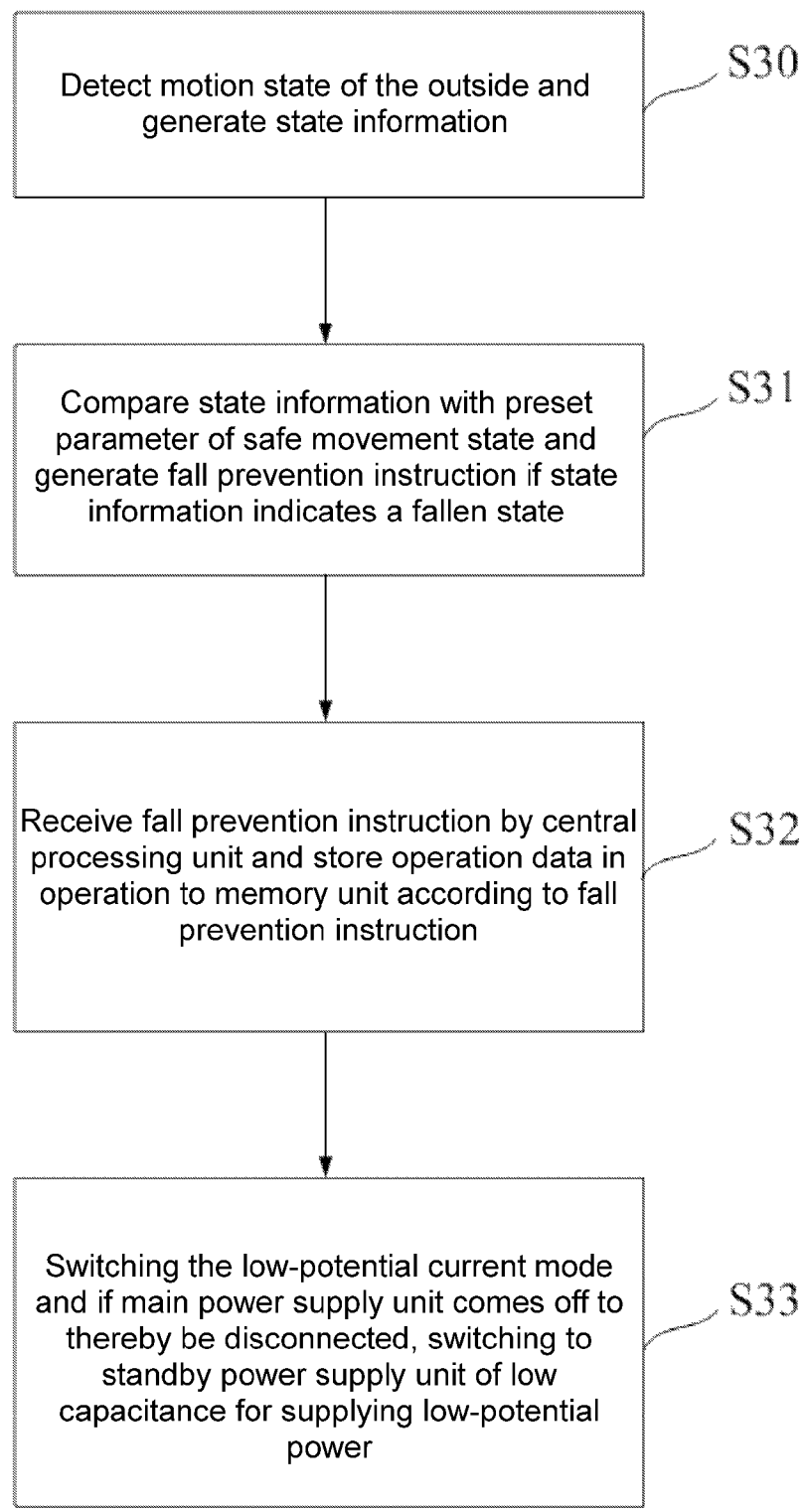
FIG. 3 is a flow chart of a method for protecting data stored in the hand-held electronic device while the hand-held electronic device is falling according to an embodiment of the present invention.

Referring to FIG. 3, there is shown a flow chart of a method for protecting data stored in a hand-held electronic device while the hand-held electronic device is falling according to an embodiment of the present invention. In step S30, a state-detecting unit detects a motion state of the hand-held electronic device and generates state information. Then step S31 involves comparing the state information with a preset safe movement state parameter and generating a fall instruction if the state information indicates that the hand-held electronic device is in a fall state. Step S32 involves receiving the fall instruction by a central processing unit and storing operation data in operation to a memory unit according to the fall instruction. Step S33 involves switching to a low current mode and switching, if the main power supply unit comes off to thereby be disconnected, to a standby power supply unit of low capacitance for supplying low-potential power.

The method for protecting data stored in the hand-held electronic device while the hand-held electronic device is falling according to the present invention allows a central processing unit to reduce power-consuming current required for normal movement to 3 mA from a range of current between 100 mA and 600 mA in a very short period of time (such as 1 millisecond) to thereby prevent data loss and reduce the load of the standby power supply unit.

Figure 4:
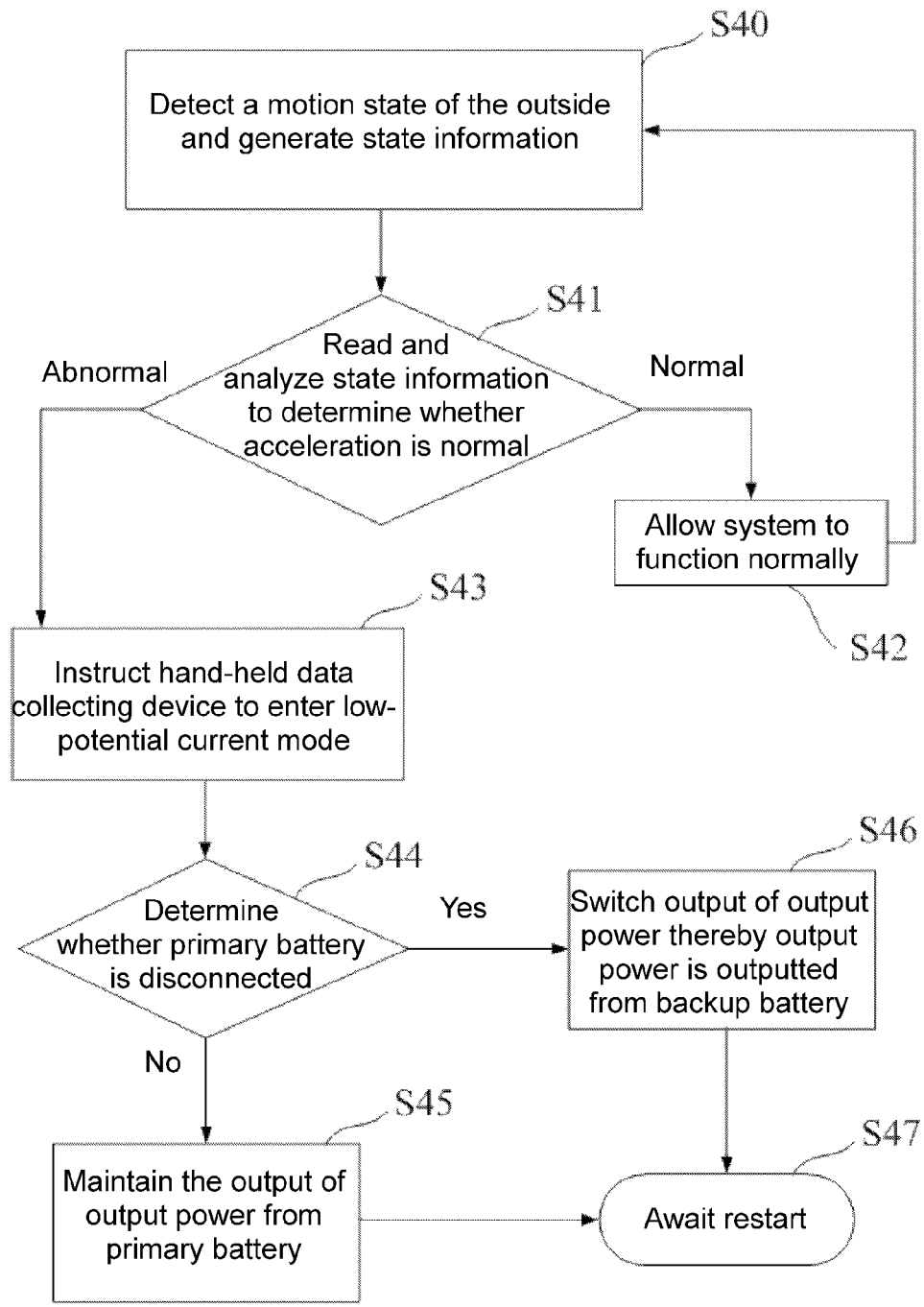
FIG. 4 is a flow chart of a method for protecting data stored in the hand-held electronic device while the hand-held electronic device is falling according to another embodiment of the present invention.

Referring to FIG. 4, there is shown a flow chart of a method for protecting data stored in the hand-held electronic device while the hand-held electronic device is falling according to another embodiment of the present invention. As shown in the drawing, step S40 involves detecting a motion state of the outside (which is essentially a motion state of the hand-held data collecting device) and generating state information. Step S41 involves reading and analyzing state information and, if it is determined that acceleration of the hand-held data collecting device is normal (i.e., the acceleration value does not exceed the range of a preset safe movement state parameter, thereby ruling out a state of fall, ejection, or tumble), going to step S42 to allow the system to function and continue the execution of a surveillance routine before returning to step S40, and, if it is determined that acceleration of the hand-held data collecting device is abnormal (i.e., the acceleration value exceeds the range of a preset safe movement state parameter, thereby conforming a state of fall, ejection, or tumble), going to step S43. Step S43 involves instructing the hand-held data collecting device to execute a low current mode selected from one of a hibernation mode and an interruption mode and then, go to step S44 for determining whether a battery is disconnected. Step S44 involves determining whether a primary battery is disconnected and, if it is determined that the primary battery is present (i.e., the primary battery is not disconnected), going to step S45, and, if it is determined that the primary battery is disconnected, going to step S46. Step S45 involves continuing the output of the output power from the primary battery. Step S46 involves switching the output of the output power such that the output power is output from a backup battery. Finally, step S47 involves awaiting restart, that is, be ready to exit the low current mode and restore the normal operation mode.

In an embodiment, in step S40, the motion state is detected by a gyroscope, an acceleration detector, or a combination of the acceleration detector and the gyroscope.

In another embodiment, power-consuming current is reduced to about 3 mA as soon as the hand-held electronic device enters the low power consumption mode.

The present invention provides a hand-held electronic device and a method for protecting data stored in the hand-held electronic device while the hand-held electronic device is falling, so as to detect a fall state of the hand-held electronic device, store operation data according to the result of the detecting the fall state, and switch power upon disconnection of a battery. The device and method of the present invention are advantageously characterized by a simplified fastening element configured for use with the battery, reduced capacitance of a standby power, enhanced security of operation data, reduced time taken to recover an operation mode, and enhanced operation efficiency. Hence, the present invention solves related problems facing the prior art in terms of data loss during the operation of a hand-held electronic device.

The present invention is disclosed in the above preferred embodiments. Persons skilled in the art should understand that the embodiments are provided to illustrate the present invention but are not interpreted to be restrictive of the scope of the present invention. It should be noted that all variations and replacements equivalent to the embodiments can be made according to the spirit and principle in the disclosure of the present invention and still fall within the scope of the invention as set forth in the appended claims. Hence, the scope of protection for the present invention should be defined by the appended claims.

What is claimed is:

1. A hand-held electronic device capable of protecting data stored therein while falling, comprising:
   a state-detecting unit for detecting a motion state of the hand-held electronic device and generating state information according to the detecting result of the motion state;
   a state-determining unit electrically connected to the state-detecting unit and configured to receive the state information and selectively output a fall instruction according to a preset safe movement state parameter;
   a central processing unit electrically connected to the state-determining unit and configured to receive the fall instruction, trigger storage of operation data during operation of the hand-held electronic device according to the fall instruction, and cause the hand-held electronic device to enter a low current mode upon completion of the operation data storage;
   a memory unit electrically connected to the central processing unit and configured to store the safe movement state parameter and the operation data;
   a main power supply unit connected to the hand-held electronic device for supplying power during an operation mode;
   a standby power supply unit for supplying power required for the low current mode, wherein the capacitance of the standby power supply unit is less than that of the main power supply unit; and
   a power supply switching unit connected to the main power supply unit, the standby power supply unit, and the central processing unit and configured to switch between the main power supply unit and the standby power supply unit, wherein the central processing unit causes the power supply switching unit to switch to the standby power supply unit upon disconnection of the main power supply unit.

2. The hand-held electronic device of claim 1, wherein the state-detecting unit is one of an acceleration detector, a gyroscope, and a combination of the acceleration detector and the gyroscope.

3. The hand-held electronic device of claim 1, wherein the low current mode is one of a hibernation mode and a standby mode.

4. A method for protecting data stored in a hand-held electronic device while the hand-held electronic device is falling, a main power supply unit connected to the hand-held electronic device for supplying power during an operation mode, comprising the steps of:
   (1) detecting a motion state of the hand-held electronic device and generating state information;
   (2) comparing the state information with a preset safe movement state parameter and generating a fall instruction if the state information exceeds a range of the safe movement state parameter;
   (3) storing operation data in operation according to the fall instruction; and
   (4) switching to a low current mode and, upon the disconnection of the main power supply unit, switching to a standby power supply unit, wherein the standby power supply unit has lower capacitance than that of the main power supply unit.

5. The method of claim 4, wherein the step (3), the power-consuming current is reduced to 3 mA upon entering into the low current mode.

6. The method of claim 4, wherein the step (1), the motion state of the hand-held electronic device is detected by one of a gyroscope, an acceleration detector, or a combination of the acceleration detector and the gyroscope.

7. The method of claim 4, wherein the step (3), the low current mode is one of a hibernation mode and a standby mode.

* * * * *